United States Patent [19]
Hasenbein et al.

[11] Patent Number: 4,906,690
[45] Date of Patent: Mar. 6, 1990

[54] GRAFTING POLYOLEFIN BLENDS AND USE OF THE GRAFT COPOLYMER BLENDS AS AN ADHESION PROMOTER AND FOR THE PREPARATION OF IONOMERS

[75] Inventors: Norbert Hasenbein, Dirmstein; Guenther Schweier, Friedelsheim; Hans Gropper, Ludwigshafen; Rainer A. Werner, Bad Durkheim, all of Fed. Rep. of Germany

[73] Assignee: Basf Aktiengesellschaft, Ludwigshafen, Fed. Rep. of Germany

[21] Appl. No.: 293,356

[22] Filed: Jan. 4, 1989

[30] Foreign Application Priority Data

Jan. 8, 1988 [DE] Fed. Rep. of Germany ....... 3800307

[51] Int. Cl.$^4$ .................... C08F 255/04; C08F 287/00
[52] U.S. Cl. ......................................... 525/88; 525/21
[58] Field of Search ..................................... 525/88, 21

[56] References Cited

U.S. PATENT DOCUMENTS 3,873,643 3/1975 Wu et al. .............................. 260/889
4,612,155 9/1986 Wong et al. ......................... 525/184

Primary Examiner—Allan M. Lieberman
Attorney, Agent, or Firm—Keil & Weinkauf

[57] ABSTRACT

Ethylenically unsaturated carboxylic acids and/or carboxylic anhydrides are grafted onto polyolefin blends by a process in which the polyolefin blend consists of from 5 to 49 parts by weight of an ethylene/propylene block copolymer having an ethylene content of less than or equal to 20% by weight and from 51 to 95 parts by weight of a homopolymer or copolymer of ethylene, and the resulting graft copolymer blends are used as adhesion promoters, in particular for polyethylene/adhesion promoter/steel composites, and for the preparation of ionomers.

6 Claims, No Drawings

GRAFTING POLYOLEFIN BLENDS AND USE OF THE GRAFT COPOLYMER BLENDS AS AN ADHESION PROMOTER AND FOR THE PREPARATION OF IONOMERS

The present invention relates to a process for grafting ethylenically unsaturated carboxylic acids and/or carboxylic anhydrides onto blends of polyolefins.

Graft copolymers can be prepared by reacting the base materials with peroxides or subjecting the said materials to strong mechanical stresses, producing radicals in this manner and bringing them into contact with suitable monomers. According to British Patent 679,562, the radicals can be produced by high speed stirrers, shaking, milling, kneading, ultrasonic vibrations or passage through filters or capillary tubes at high linear velocities. This results in degradation of the polymer to form reactive radicals, at which the graft reaction can take place. If the graft reaction is carried out in a disk extruder, with polyethylene as the base polymer and maleic anhydride as the monomer to be grafted, crosslinking reactions are observed (cf. Plaste und Kautschuk 23 [3] (1976), 185–187). According to the same publication, owing to the lack of initiators no reaction at all is obtained if it is desired to use conventional extruders for the reaction.

However, grafting can also be carried out in conventional extruders if suitable initiators, such as organic peroxides, are added to the reaction mixture and the reaction is carried out in a special reaction zone described in, for example, U.S. Pat. Nos. 3,862,265, 3,953,655 and 4,001,172. However, polymer degradation takes place in this case too, and where the base polymer is polyethylene there is furthermore a danger of crosslinking.

U.S. Pat. Nos. 3,873,643 and 4,612,155 have disclosed a process for grafting ethylenically unsaturated carboxylic acids or carboxylic anhydrides onto blends of polyolefins. In these known processes, modified polyolefins having improved compatibility with fillers and having good adhesion properties, for example with respect to aluminum, are obtained. However, the adhesion properties are still insufficient for bonding various substrates, in particular for polyethylene/adhesion promoter/steel composites. U.S. Pat. Nos. 4,472,555 and 4,477,532 describe modified polyolefin adhesive mixtures and composites produced therefrom, especially for polypropylene. The known adhesive mixtures are obtained by grafting an ethylenically unsaturated carboxylic acid onto high density polyethylene, essentially at elevated temperatures, and then mixing the product with a polyolefin, for example in a heated extruder. The disadvantage of this process is the fact that the material used has frequently been subjected to high temperatures, and degradation products may therefore form.

A particularly elegant process for the preparation of graft copolymers which protects the polymer base material is proposed in U.S. application Ser. No. 07/116,864, now abandoned. In this process, not peroxides are used and the grafting yield with low concentrations of monomer to be grafted is nevertheless very high. If, for example, maleic anhydride is used as the graft monomer in a concentration of 0.25% by weight, based on the base polymer, the grafting yield is virtually quantitative. This is a great advantage not only for economic reasons but, in the case of a monomer as toxic as maleic anhydride, especially for reasons relating to occupational hygiene. The graft copolymers obtained can be used as adhesion promoters for iron/polyethylene composites. Although the peeling strengths of such iron/adhesion promoter/polyethylene composite sheets are very high at application temperatures of about 25° C., they are not always sufficient for particular loads, especially at elevated application temperatures.

It is an object of the present invention to provide a process for grafting unsaturated carboxylic acids and/or anhydrides, in which the resulting graft products have particularly high adhesion to both polar and nonpolar substrates. At the same time, neither degradation nor crosslinking of base polymer or polymers should take place, and the monomer conversion should be as complete as possible.

We have found that this object is achieved by a process in which grafting is carried out on a polyolefin blend of from 51 to 95 parts by weight of a homopolymer or copolymer of ethylene (A) and from 5 to 49 parts by weight of an ethylene/propylene block copolymer (B) which differs from A.

The polymer (B) preferably has an elastomer content of more than 35% by weight, the elastomer content being determined as a xylene extract at 80° C.

The polymer blend to be grafted preferably contains from 5 to 20 parts by weight of the polymer (B).

The polymer blend to be grafted particularly preferably contains from 8 to 12 parts by weight of the polymer (B).

The homopolymer or copolymer of ethylene (A) preferably has density greater than or equal to 0.930 g/cm$^3$.

We have found that this object is furthermore achieved by graft copolymers prepared by the claimed processes.

Particularly suitable ethylenically unsaturated carboxylic acids and/or their derivatives are the conventional compounds, such as maleic acid, fumaric acid, itaconic acid, acrylic acid, acrylic anhydride, methacrylic acid, crotonic acid, maleic anhydride and itaconic anhydride. Preferred compounds are maleic acid, fumaric acid and in particular maleic anhydride.

Homopolymers or copolymers (A) of ethylene are understood as being, in particular, high density polyethylenes (HDPE), medium density polyethylenes (MDPE), linear low density polyethylene (LLDPE) or very low density polyethylene (VLDPE). However, products obtained by the high pressure process are also suitable, in particular low density polyethylene (LDPE), ethylene/vinyl acetate copolymers and ethylene/acrylate copolymers. However, polyethylenes having densities greater than or equal to 0.930 g/cm$^3$ are preferred. The densities were determined according to DIN 53,479.

The ethylene/propylene block copolymers used have an ethylene content of less than or equal to 20% by weight and a propylene content of greater than or equal to 80% by weight. Small amounts of further monomers, for example butadiene or norbornene, may also be present in the polymer. The ethylene/propylene block copolymers (B) are prepared by a process described in EP-A-131 268. Ethylene/propylene block copolymers having an elastomer content of more than 35% by weight are very particularly preferred, the elastomer content being determined as a xylene extract at 80° C.

In the novel process, the monomers to be grafted are used in a concentration of from 0.01 to 0.5% by weight, based on the polymer blend, and are mixed with the polymer blend which has been melted at not less than 140° C., and the graft reaction is carried out at from 210° to 300° C., for example in a conventional extruder under from 1 to 500 bar, in the absence of a free radical initiator.

Grafting is preferably carried out at a concentration of from 0.05 to 0.5, preferably from 0.1 to 0.25, % by weight. The preferred temperature range is from 220° to 280° C., in particular from 240° to 280° C.

Another preferred process is one in which the monomer to be grafted is admixed in the liquid state. All processes in which grafting is carried out in the absence of peroxides, ie. in the absence of a free radical catalyst, are preferred. However, it is also possible for small amounts of from 0.01 to 0.1% by weight, based on the polymer blend, of an organic peroxide to be present in the graft reaction.

Grafting of the unsaturated carboxylic acids and/or their anhydrides was carried out in a commercial twin-screw extruder, for example ZSK 57 from Werner & Pfleiderer. However, it is also possible to use other prior art reactors, for example a Brabender reactor. The polymer blend and, if required, also the monomer to be grafted were melted at not less than 140° C., mixed thoroughly and then reacted at elevated temperatures, ie. from 210° to 300° C., preferably from 220° to 280° C., particularly preferably from 240° to 280° C. It is not important whether the monomer to be grafted is added to the reactor before or after the polymer blend has been melted. The monomers to be grafted were used in a concentration of from 0.01 to 0.5, preferably from 0.1 to 0.25, % by weight, based on the ethylene polymer. It was found that the yields of grafted monomer are virtually quantitative and that the base polymer undergoes neither significant crosslinking nor degradation.

The adhesion of these products prepared with the addition of an ethylene/propylene block copolymer (B) is substantially higher than that of products obtained without the addition of a propylene polymer (B). This is surprising since other added tougheners, such as very low density polyethylene or an LDPE rubber, even slightly reduce the adhesion. It is also surprising that the addition of an ethylene/propylene block copolymer in an amount greater than 49 parts by weight and less than 5 parts by weight reduces the adhesion, whereas the adhesion is dramatically increased in the case of ethylene/propylene block copolymer concentrations greater than 5 parts by weight and less than 49 parts by weight, a concentration range of ethylene/propylene block copolymer (B) of from 5 to 20, in particular from 8 to 12, parts by weight being preferred.

A preferred graft process is one in which grafting is carried out after the base polymers have been thoroughly mixed to give a homogeneous mixture.

Although the graft reactions can in principle also be carried out with poor yields based on monomer to be grafted and/or with the use of peroxides, preferred processes are those which do not require peroxides for grafting and whose conversions based on graft monomer are virtually quantitative. In the case of the products prepared according to the invention, the flow is scarcely reduced at all compared with the base polymer.

In contrast to the graft copolymers prepared using a peroxide, the products prepared without the use of a peroxide can be readily processed. The films produced from these products have substantially fewer specks than films obtained from graft products prepared using a peroxide. The products obtained by peroxide-free grafting are furthermore completely colorless and odorless.

The use of similar graft copolymers, which consist of ethylene polymers and grafted unsaturated carboxylic acids or carboxylic anhydrides, for the preparation of adhesion promoters and adhesives is known per se and is described in, for example, British Patent 2,081,723 and U.S. Pat. No. 4,487,885. The use of similar graft copolymers for the preparation of ionomers is also sufficiently well known from the literature that further description is unnecessary here (cf. for example U.S. Pat. Nos. 3,264,272 or 3,437,718). In the preparation of the ionomers, the free graft copolymers are reacted with inorganic bases or salts to give the corresponding salts. Alkali metal compounds and salts of the alkali metals, alkaline earth metals or zinc with organic acids are particularly suitable.

EXAMPLE 1

90 parts by weight of MDPE (copolymer of 95.8% by weight of ethylene and 4.2% by weight of butene; melt flow index=4.5 g/10 min, determined in all experiments according to ASTM-D-1238-65T at 190° C. and under a load of 2.16 kg; density=0.930 g/cm$^3$, determined in all experiments according to DIN 53,479) were melted together with 10 parts by weight ®Novolen 2800 JX (block copolymer from BASF, consisting of 85% by weight of propylene and 15% by weight of ethylene) at 140° C. in a ZSK 57 twin-screw extruder from Werner & Pfleiderer. 0.15 part by weight of maleic anhydride in liquid form was pumped into the melt, mixed with the polymer blend and reacted at 220° C. Unconverted maleic anhydride was removed from the polymer melt by devolatilization under reduced pressure.

The mean residence time of the grafting components in the extruder was 2 minutes, and the polymer throughput was 50 kg/h at 150 rpm.

The yield based on grafted maleic anhydride was 99.5% by weight. The grafted polymer was improved adhesion to polar substances, such as epoxy resins and metals, and is furthermore completely colorless and odorless.

EXAMPLE 2 AND COMPARATIVE EXPERIMENT A

The polymer base material was grafted with maleic anhydride under the conditions described in Example 1, except that the polymer base material consisted of 100 parts by weight of MDPE.

The products obtained were pressed to give 2.7 mm thick iron/adhesion promoter/polyethylene composite sheets, and the peeling strengths were determined by a test based on DIN 30,670. Table 1 shows that the product grafted with the addition of the ethylene/propylene block copolymer (Example 2) has very much higher adhesion than the product in which the polymer base material was exclusively MDPE (Comparative Experiment A).

TABLE 1

| | Yield based on grafted maleic anhydride (% by weight) | Reaction temperature °C. | Melt flow index of product 2.16 kg/ 10 min | Adhesion of composite sheet N/2 cm strip width | |
|---|---|---|---|---|---|
| | | | | 25° C. | 80° C. |
| Comparative Experiment A | 99.5 | 220 | 3.7 | 80 | 40 |
| Example 2 | 99.5 | 220 | 3.5 | 140 | 100 |

EXAMPLE 3

90 parts by weight of MDPE (copolymer of 97.5% by weight of ethylene and 2.5% by weight of butene; melt flow index 4.5 g/10 min) were melted together with 10 parts by weight of Novolen 2800 JX at 140° C. in a ZSK 57 twin-screw extruder from Werner & Pfleiderer. 0.2 part by weight of maleic anhydride in liquid form was pumped into the melt, mixed with the polymer blend and reacted at 260° C. Unconverted maleic anhydride was removed from the polymer melt by devolatilization under reduced pressure.

The mean residence time of the grafting components in the extruder was 2 minutes, and the polymer throughput was 50 kg/h at 150 rpm.

The yield based on grafted maleic anhydride was 97% by weight. The grafted polymer has excellent adhesion to polar substrates, such as epoxy resins or metals, and is furthermore completely colorless and odorless.

EXAMPLE 4 COMPARATIVE EXPERIMENT B

The polymer base material was grafted under the conditions described in Example 3, except that, instead of the ethylene/propylene block copolymer Novolen 2800 JX, a propylene homopolymer, Novolen 1100 HX, was used.

The products obtained were pressed to give 2.7 mm thick iron/adhesion promoter/polyethylene composite sheets, and the peeling strengths were determined by a test based on DIN 30,670. Table 2 shows that the product grafted with the addition of the ethylene/propylene block copolymer (Example 4) has very much higher adhesion than the product grafted with the addition of a propylene homopolymer (Comparative Experiment B).

TABLE 2

| | Yield based on grafted maleic anhydride (% by weight) | Reaction temperature °C. | Melt flow index of product 2.16 kg/ 10 min | Adhesion of composite sheet N/2 cm strip width 25° C. |
|---|---|---|---|---|
| Comparative Experiment B | 97 | 260 | 4.0 | 150 |
| Example 4 | 97 | 260 | 4.0 | 250 |

EXAMPLE 5

90 parts by weight of LLDPE (copolymer of 93% by weight of ethylene and 7% by weight of butene; melt flow index 4.5 g/10 min; density=0.920 g/cm$^3$) were melted together with 10 parts by weight of Novolen 2800 JX at 140° C. in a ZSK 57 twin-screw extruder from Werner & Pfleiderer. 0.12 part by weight of maleic anhydride in liquid form was pumped into the melt, mixed with the polymer blend and reacted at 220° C. Unconverted maleic anhydride was removed from the polymer melt by devolatilization under reduced pressure.

The mean residence time of the grafting components in the extruder was 2 minutes, and the polymer throughput was 50 kg/h at 150 rpm.

The yield based on grafted maleic anhydride was 99.5% by weight. The grafted polymer has improved adhesion to polar substances, such as epoxy resins or metals, and is furthermore completely colorless and odorless.

EXAMPLE 6 AND COMPARATIVE EXPERIMENT C

The polymer base material was grafted with maleic anhydride under the conditions described in EXAMPLE 5, except that the polymer base material consisted of 100 parts by weight of LLDPE.

The products obtained were pressed to give 2.7 mm thick iron/adhesion promoter/polyethylene composite sheets, and the peeling strengths were determined by a test based on DIN 30,670. Table 3 shows that the product grafted with the addition of the ethylene/propylene block copolymer (Example 6) has very much higher adhesion than the product in which the polymer base material was exclusively LLDPE (Comparative Experiment C).

TABLE 3

| | Yield based on grafted maleic anhydride (% by weight) | Reaction temperature °C. | Melt flow index of product 2.16 kg/ 10 min | Adhesion of composite sheet N/2 cm strip width 25° C. |
|---|---|---|---|---|
| Comparative Experiment C | 99.5 | 220 | 4.0 | 50 |
| Example 6 | 99.5 | 220 | 4.0 | 100 |

EXAMPLE 7 AND COMPARATIVE EXPERIMENT D

The polymer base material was grafted with maleic anhydride under the conditions described in Example 1, except that, instead of 10 parts by weight of ®Novolen 2800 JX, 10 prts by weight of ®DFDA 1137 (ethylene/butene copolymer from UCC, containing 87.5% by weight of ethylene and 12.5% by weight of butene and having a density of 0.906 g/cm³) were used for modification.

The products obtained were pressed to give 2.7 mm thick iron/adhesion promoter/polyethylene composite sheets, and the peeling strengths were determined by a test based on DIN 30,670. Table 4 shows that the product grafted with the addition of the ethylene/propylene block copolymer (Example 7) has very much higher adhesion than a product modified with the rubber-like ethylene copolymer.

TABLE 4

|  | Yield based on grafted maleic anhydride (% by weight) | Reaction temperature °C. | Melt flow index of product 2.16 kg/ 10 min | Adhesion of composite sheet N/2 cm strip width 25 ° C. |
| --- | --- | --- | --- | --- |
| Comparative Experiment D | 99.5 | 220 | 3.8 | 30 |
| Example 7 | 99.5 | 220 | 3.5 | 140 |

EXAMPLE 8 AND COMPARATIVE EXPERIMENT E

The polymer blend was grafted with maleic anhydride under the conditions described in Example 5, except that, instead of 10 parts by weight of Novolen 2800 JX, 10 parts by weight of an LDPE rubber (quaternary copolymer of 60.05% by weight of ethylene, 34% by weight of n-butyl acrylate, 5.3% by weight of acrylic acid and 0.65% by weight of maleic anhydride) were used for modification.

The products obtained were pressed to give 2.7 mm thick iron/adhesion promoter/polyethylene composite sheets, and the peeling strengths were determined by a test based on DIN 30,670. Table 5 shows that the product grafted with the addition of the ethylene/propylene block copolymer (Example 8) has very much higher adhesion than a product modified with a rubber-like ethylene copolymer.

TABLE 5

|  | Yield based on grafted maleic anhydride (% by weight) | Reaction temperature °C. | Melt flow index of product 2.16 kg/ 10 min | Adhesion of composite sheet N/2 cm strip width 25° C. |
| --- | --- | --- | --- | --- |
| Comparative Experiment E | 99.5 | 220 | 4.0 | 40 |
| Example 7 | 99.5 | 220 | 4.0 | 100 |

EXAMPLE 9 AND COMPARATIVE EXPERIMENTS F TO J

The polymer base material was grafted with maleic anhydride under the conditions described in Example 3, except that the amounts by weight of the ethylene/propylene block copolymer in the polymer blend were varied as follows: 50 parts by weight (Comparative Experiment F), 20 parts by weight (Comparative Experiment G), 10 parts by weight (Example 9), 4.9 parts by weight (Comparative Experiment H), 2 parts by weight (Comparative Experiment I) and 0 part by weight (Comparative Experiment J).

The products obtained were pressed to give 2.7 mm thick iron/adhesion promoter/polyethylene composite sheets, and the peeling strengths were determined by a test based on DIN 30,670. Table 6 shows that, with the addition of 50 parts by weight of ethylene/propylene block copolymer, the composite comprising iron/adhesion promoter/polyethylene has virtually no adhesion, in contrast to the composite containing an adhesion promoter without the addition of the ethylene/propylene block copolymer (Comparative Experiment J). If the ethylene/propylene block copolymer is added in an amount of 2 parts by weight (Comparative Experiment I) or 4.9 parts by weight (Comparative Experiment H), the adhesion decreases with increasing number of parts by weight of ethylene/propylene block copolymer. Surprisingly, at 20 parts by weight (Comparative Experiment G), and 10 parts by weight (Example 9), it is substantially greater than that of Comparative Experiment J (0 part by weight of ethylene/propylene block copolymer).

TABLE 6

|  | Yield based on grafted maleic anhydride (% by weight) | Reaction temperature °C. | Melt flow index of product 2.16 kg/ 10 min | Adhesion of composite sheet N/2 cm strip width 25° C. |
| --- | --- | --- | --- | --- |
| Comparative Experiment F | 97 | 260 | 3.7 | No adhesion |
| Comparative Experiment G | 97 | 260 | 3.7 | 250 |
| Comparative Experiment H | 97 | 260 | 3.9 | 125 |
| Comparative | 97 | 260 | 3.8 | 50 |

TABLE 6-continued

|  | Yield based on grafted maleic anhydride (% by weight) | Reaction temperature °C. | Melt flow index of product 2.16 kg/ 10 min | Adhesion of composite sheet N/2 cm strip width 25° C. |
|---|---|---|---|---|
| Experiment I Comparative Experiment J | 97 | 260 | 3.9 | 150 |
| Example 9 | 97 | 260 | 4.0 | 250 |

EXAMPLE 10 AND COMPARATIVE EXPERIMENTS K TO O

The polymer base material was grafted with maleic anhydride under the conditions described in EXAMPLE 9, except that 0.15 part by weight instead of 0.2 part by weight was used for grafting the polymer base materials.

The products obtained were pressed to give 2.7 mm thick iron/adhesion promoter/polyethylene composite sheets, and the peeling strengths were determined by a test based on DIN 30,670. Table 7 shows that, with the addition of 50 parts by weight of ethylene/propylene block copolymer, the composite comprising iron/adhesion promoter/polyethylene has virtually no adhesion, in contrast to the composite containing an adhesion promoter without the addition of the ethylene/propylene block copolymer (Comparative Experiment O). If the ethylene/propylene block copolymer is added in an amount of 2 parts by weight (Comparative Experiment N) or 4.9 parts by weight (Comparative Experiment M), the adhesion decreases with increasing number of parts by weight of ethylene/propylene block copolymer. Surprisingly, at 20 parts by weight (Comparative Experiment L), and 10 parts by weight (Example 10), it is substantially greater than that of Comparative Experiment K (0 part by weight of ethylene/propylene block copolymer).

We claim:

1. A process for preparing a graft copolymer of grafting monomers selected from the group consisting of ethylenically unsaturated carboxylic acids, carboxylic anhydrides and mixtures thereof and a polyolefin blend of from 51 to 95 parts by weight of a homopolymer or copolymer of ethylene (A) and from 5 to 49 parts by weight of an ethylene/propylene block copolymer (B), which differs from (A), having an ethylene content of less than or about equal to 20% by weight and a propylene content of greater than or equal to 80% by weight, said process comprising:

mixing 0.01 to 0.5% by weight, based on the polyolefin blend, of said monomers with the polyolefin blend in a molten state; and carrying out the grafting reaction at a temperature of from 21° C. to 300° C. and under a pressure of from 1 to 500 bar in the absence of a free-radical initiator.

2. The process of claim 1, wherein the polymer (B) has an elastomer content of more than 35% by weight, the elastomer content being determined as a xylene extract at 80° C.

3. The process of claim 1, wherein the polymer blend to be grafted contains from 5 to 20 parts by weight of the polymer (B).

4. The process of claim 1, wherein the polymer blend to be grafted contains from 8 to 12 parts by weight of the polymer (B).

5. The process of claim 1, wherein the homopolymer or copolymer of ethylene (A) has a density greater than or equal to 0.930 g/cm$^3$.

6. A graft copolymer prepared by the process of claim 1.

* * * * *